United States Patent [19]

Vasishth et al.

[11] 4,276,329
[45] Jun. 30, 1981

[54] WOOD TREATMENT PROCESS AND PRODUCT THEREOF

[75] Inventors: Ramesh C. Vasishth, Danville, Calif.; Dodwell P. deSilva, Vancouver, Canada

[73] Assignee: Envirosol Systems International, Ltd., Orinda, Calif.

[21] Appl. No.: 91,030

[22] Filed: Nov. 5, 1979

Related U.S. Application Data

[63] Continuation-in-part of Ser. No. 23,051, Mar. 22, 1979, abandoned.

[30] Foreign Application Priority Data

May 16, 1979 [CA] Canada ................................. 327689

[51] Int. Cl.$^3$ .......................... B05D 1/18; B05D 3/02
[52] U.S. Cl. ................................ 427/393; 260/29.2 E; 260/31.2 XA; 260/33.2 R; 260/33.4 R; 427/440
[58] Field of Search ................................ 427/393, 440; 260/29.2 E, 31.2 XA, 33.4 R, 33.2 R

[56] References Cited

U.S. PATENT DOCUMENTS

| | | | |
|---|---|---|---|
| 2,591,768 | 4/1952 | Austin | 427/393 X |
| 3,647,516 | 3/1972 | Edwards | 427/393 X |
| 4,071,514 | 1/1978 | Ribbecke et al. | 260/22 M |
| 4,085,251 | 4/1978 | Rak | 427/393 X |
| 4,168,255 | 9/1979 | Lewis et al. | 427/393 X |

OTHER PUBLICATIONS

Smulski, Stephen, *Relationship of Water Borne Coatings & Grain–Raising in Wood*, Apr., 1978, pp. 1–8.
Vasishth, Ramesh C., *A New Approach to Wood Protection & Wood Coatings*, May, 1979, pp. 1–10.

*Primary Examiner*—Michael R. Lusignan
*Attorney, Agent, or Firm*—Townsend and Townsend

[57] ABSTRACT

A method for treating wood to enhance its properties comprising: contacting the wood to be treated with sufficient water dilutable resin in a water miscible solvent and water to deposit said resin in the cell walls of the wood fibers, said resin containing molecules of a size which can enter the free space in said cell walls, and converting the resin in said cell walls to a water insoluble form. The treatment provides wood of improved dimensional stability and resistance to checking on exposure to water. Further improvements in the wood properties can be obtained by depositing additives such as preservatives or fire retardants in the cell walls of the wood and fixing the additives therein with the insolubilized resin.

23 Claims, No Drawings

WOOD TREATMENT PROCESS AND PRODUCT THEREOF

This application is a continuation-in-part of U.S. Ser. No. 23,051 filed Mar. 22, 1979, abandoned.

FIELD OF THE INVENTION

This invention relates to the treatment of wood to enhance its properties. More particularly it relates to the impregnation of wood with resin and optionally with various additives such as preservatives and fire retardants.

DESCRIPTION OF THE PRIOR ART

It is well established that wood expands and contracts depending upon the degree of swelling of its cell walls. The wood cell walls exhibit varying degrees of swelling depending upon the particular solvent or solvent vapor it is exposed to and its affinity for this solvent or solvent vapor. Thus, exposure to water or water vapor causes a high degree of swelling, and exposure to less polar solvents or solvent mixtures such as ethanol-xylene mixture causes its cell walls to dehydrate resulting in shrinkage.

Additionally, when the wood cell wall, consisting mainly of cellular chains, is swollen it has maximum porisity—that is, the free space between actual cellular chains is large, and when it is not swollen the porosity is very low. Consequently, the size and amount of molecules that can be deposited within the wood cell walls is dependent upon the degree of swelling of the cell walls.

The above property of wood has been used in a variety of ways to impart specific properties to wood. Thus water soluble poly-glycols, such as polyethylene glycol having a molecular weight of about 3000 to 6000 can be introduced into wood cells walls in their wet or swollen state. (See "New and Better Ways to Dimensionally Stabilize Wood", A. J. Stam, Forest Products Journal, 9(1959):3,107-110, and "PEG of the Woodworker's Heart", Harry C. Leslie, Man Society Technology, A Journal of Industrial Arts Education, 33(1):13-16, Sept., Oct., 1973.) Such polyglycols have a low vapor pressure and, unlike water, evaporate only very slowly. Consequently, the above treatment is very effective in preventing checking and cracking of wood. Such a treatment is often used to treat wood engravings, statues, etc., giving these wooden pieces a long life even when stored in dry atmosphere. However, poly-glycols remain water soluble and leach out when wood treated with these is exposed to wet conditions. The usefulness of this treatment is therefore very limited.

Using somewhat the same concept, water soluble low molecular weight phenolic and urea resins have been used to treat wood. (See U.S. Pat. Nos. 3,968,276, 3,519,476 and 3,493,417.) To fix these resins within the wood cell walls subsequent heat treatment is required to cure the phenolic resin to make it water insoluble. Very often a combination of heat and pressure is used to further densify the wood. Such a treatment, though effective, requires special equipment and is thus practiced only for industrial production of special articles where water or chemical resistance or structural strength or a combination of these is needed.

Many other polymers have been used to impregnate wood. Some of these include the use of acrylic type monomers (U.S. Pat. No. 3,663,261), polyisocyanate (U.S. Pat. No. 3,539,386), and dibromopropyl glycidyl ether (U.S. Pat. No. 3,483,021). All of these treatments require a secondary treatment of wood after the impregnation step to polymerize the monomers in situ to fix it in the wood. The secondary treatment most often used is to heat the impregnated wood, although in the case of vinyl type monomers such as the acrylics, gamma ray exposure may also be used. The requirement of a post impregnation secondary treatment is expensive and cumbersome. Consequently, none of these techniques have found a wide acceptance in industry.

Even when the wood cell walls are in a wet or swollen state, only relatively small size molecules can penetrate the wood cell walls. The actual size of the molecule that will penetrate the wood cell walls is dependent upon the degree of swelling and the species of wood. Polymers which are large in molecular size will not penetrate even a swollen wood cell wall. Thus for example, polyvinyl acetate and polyacrylate emulsions have been used for years to produce adhesives and paints for wood. Unlike condensation polymers, such as the phenolic resin mentioned earlier, these emulsions are produced by free radical or chain polymerization and do not contain any appreciable quantities of low molecular weight components. (See *Text Book of Polymer Science*, F. W. Billmeyer, Jr., Interscience Publishers, 1966.) Consequently, when wood is treated with these emulsions, the wood cell walls swell due to the presence of water but the polymer molecules are too large to penetrate even the swollen wood cell wall. Consequently the wood gets a protective coating but its other properties such as resistance to checking and cracking are not affected. It is therefore not useful to use a water borne polymer of large molecular size to achieve the objectives of this invention.

Low molecular weight vinyl resins such as acrylic resins are known but their utility for the treatment of wood cell walls to improve check resistance, dimensional stability and other properties has not been recognized. For example, such resins have been suggested for use in floor polishes as a leveling aid.

Alkyds are condensation polymers and contain an appreciable quantity of low molecular weight components (*Text Book of Polymer Science*, supra). Moreover, alkyds crosslink and cure, that is, become solvent resistant and partially infusible, by reacting with air. In the past only alkyds soluble in organic solvents, were standard items of commerce. The organic solvents in these alkyds do not swell the wood cell walls. Many of them actually shrink the wood cell walls by displacing water and reduce the porosity of wood.

In the last decade or so, alkyds that are soluble in water or a water polar solvent mixture have been extensively used in industrial finishes such as coatings for washing machines, refrigerators, automobiles, etc. However, it was not realized that they also form a basis for imparting the so highly sought properties of reducing checking and cracking, introducing dimensional stability, and of substantially permanent fire retardant and preservative treatment of wood, without a secondary post impregnation treatment of heating or exposure to gamma rays. Simple exposure to air is sufficient to crosslink them to form a polymer in situ. Moreover, being in water, and containing an abundant amount of small but reactive molecules, they have excellent penetration into wood cell walls.

SUMMARY OF THE INVENTION

In the preferred embodiment the present invention permanently deposits specific chemical mixtures within the cell walls of wood fibers, the combination of chemicals to be deposited having been solubilized in water or water-water miscible solvent combinations, so as to swell the wood cell wall and thus achieve maximum penetration of the chemicals into the wall itself. The chemicals selected are such that at least one of the components of the mixture comprises molecules of a small size capable of entering the free space in the cell walls in the presence of the solvent and which are capable of being converted at ambient conditions, either by itself or aided by the presence of other chemicals that may act as catalysts, to a water insoluble form, simultaneously trapping other water soluble chemicals which may be present in the mixture, thus eliminating or greatly reducing the tendency of the entire mixture to leach out on subsequent treatment of the wood with water or water containing solutions.

DESCRIPTION OF THE PREFERRED EMBODIMENT

The chemical capable of being converted to a water insoluble form used in this invention may be a water dilutable alkyd or a modified water dilutable alkyd. Examples of such alkyds are long, medium or short oil water dilutable alkyds presently commercially available from a number of different manufacturers and which are well known to the industrial coatings industry. Modified alkyds such as urethane modified alkyds are also commercially available and well known in the art. Such alkyds or modified alkyds are generally soluble in water or water-polar solvent mixtures in near neutral or slightly alkaline solutions. Examples of polar solvents are butanol or higher alcohols, ketones, butyl cellosolve, butyl carbitol, propasol, and N-methyl pyrrolidone.

By way of background, it is known that alkyd resins are made by combining synthetic dibasic acids such as phthalic anhydride, isophthalic anhydride, trimelytic anhydride with synthetic or natural fatty oils, i.e., glycerides of fatty acids. The fatty acids or their glycerides used generally contain mixtures of fatty acids of varying chain lengths and varying degree of unsaturation in the chain.

Alkyds may be additionally modified by combining them with various glycols. Examples of glycols commonly used are pentaerythritol diethylene glycol. More drastic changes in alkyd properties can be produced by crosslinking them by the addition of isocyanates such as toluene di-isocyanate. The latter alkyds are commonly called urethane modified alkyds. Urethane modified alkyds dry to much harder finishes than alkyds not so modified. Other examples of modified alkyds include modification by reacting them with natural resins such as rosin, or with other synthetic resins such as phenolics, amino resins, silicone resins, or by reacting them with imides, styrene, and the like.

The final molecular weight or the degree of polymerization of the alkyds is controlled by adding controlled amounts of an excess of one of the reactants—fatty acids or glycols. Consequently the finished alkyds generally contain small amounts of unreacted hydroxyl, or acid groups, or both. Alkyds produced by using relatively low ratios of synthetic polybasic acid to fatty acid are called long oil alkyds, those produced with very high ratio are called short oil alkyds, and those produced with intermediate ratio are called medium oil alkyds.

The alkyd resins of the above type are soluble in both aromatic or aliphatic hydrocarbon solvents, and insoluble in most polar solvents such as water, methanol and butanol. More recently, alkyd resins have been reacted with various chemicals to improve their solubility in polar solvents. This may be achieved by incorporating highly polar groups into the alkyd structure. As an example, alkyd may be made by using an excess of acid with the final product having an acid number ranging from about ten to one hundred, preferably around 20 to 60. The acid groups are then partially or wholly neutralized using an amine or ammonia or a combination of amines and ammonia. The products so made are then soluble in such polar solvents as methanol, butanol, carbitol, butyl Cellosolve (ethylene glycol monobutyl ether) and mixtures of such solvents with water. To achieve full solubility, mixtures of the above type solvents may have to be used. For example, some of these alkyds have greater solubility in higher boiling solvents such as butyl Carbitol (diethylene glycol monobutyl ether) or butyl Cellosolve, and addition of such solvents may increase the amount of water that can be used as a part of the solvent system. It is these alkyd resins that have been modified for dissolving in polar solvents that are useful in the present invention and are referred to herein as water dilutable alkyds.

Aside from simple alkyds, short, medium or long oil length, alkyds modified by reacting them with isocyanates, acrylics or other suitable chemicals commonly used to modify alkyds may be used for practicing the present invention. These modifications are the same as those used with organic solvent based alkyds and which have been further modified with neutralizable acid groups for solubility in polar solvents.

It should be noted that the present invention is not limited to the types of modified alkyds discussed. Any water dilutable polymeric system that is soluble in polar solvents, or mixtures of polar solvents, or mixtures of polar solvent and water, and capable of being converted to a water insoluble stage such as through curing by exposure to air, by evaporation of water, or by volatilization of a water solubilizing amine component under ambient conditions of temperature and pressure, may be used to practice the invention. For best results, whatever resin that is selected should contain at least 5 weight percent of molecules having a molecular weight lower than about 1000, preferably 10 weight percent of molecules having a molecular weight below about 1000. This will promote entry into the free space of the wood cell wall. The larger molecules which are too large to enter the free space of the wood cell wall form a protective and decorative layer on the wood surface.

While all water dilutable polymeric systems as described above are broadly useful in the present invention, it should be understood that some resins may be more satisfactory than others in a particular application. For example, stability of the resin solvent systems differ and resin precipitation may occur more quickly in some systems than in others. It has been observed that the choice of resin is more critical with respect to stability in more dilute resin solutions containing less than about 20 weight percent of resin. In such solutions several resins may be tried to select one having optimum properties. Example III given below illustrates a resin-solvent system having relatively long term stability at low resin conentrations.

Like oil or organic solvent dilutable alkyds, the water dilutable alkyds or modified alkyds react with oxygen in the air and crosslink to form a water insoluble product. The rate of crosslinking can be substantially increased by adding small quantities, generally 0.05 to 1.0 weight percent, of catalysts such as driers. Examples of driers that may be used are calcium, cobalt, manganese and zirconium naphthenates or chelated salts of calcium, cobalt, manganese or zirconium.

It has been surprisingly found that the above water dilutable alkyd solutions, when applied to wood, penetrate the wood cell wall and on subsequent exposure to air become water insoluble. They can therefore be used to stabilize the wood cell walls, thus imparting greatly improved dimensional stability or reduced tendency to expand and contract with changes in humidity.

It has also been surprisingly found that other chemicals that are normally water soluble or soluble in the above alkyd solution, when used in conjunction with these alkyd or modified alkyd solutions, also penetrate the wood cell walls and on subsequent air curing of the alkyd or modified alkyd become fixed in the wood and are substantially water non-leachable.

Thus, in addition to imparting dimensional stability to wood, this discovery can be used to treat wood with a number of chemicals that give wood long lasting and other special properties. Thus, normally water soluble fire retardant chemicals may be used to give treated wood durable non-water-leachable fire retardant properties. Similarly, water soluble wood preservatives, both organic and inorganic, may be introduced into wood and upon curing of the alkyd or modified alkyd become non-leachable giving wood the capability of retaining these compounds even under wet and humid conditions of use.

The present invention can be used in a variety of ways. For example, if it is desired to impart check resistance and dimensional stability to wood, a simple treatment with a solution of a water dilutable alkyd containing suitable driers followed by air drying may be sufficient. The amount of material deposited in the wood cell walls is proportional to the concentration of the material in the treating solution. This applies to the binder polymer as well as to other ingredients such as wood preservatives or fire retardants.

The binder polymer used may be as concentrated as about 70 weight percent or as low as about 5 weight percent in concentration. Generally mixtures of about 5 weight percent to about 30 weight percent are preferred as above this concentration range the viscosity of the solution is very high. Very viscous solutions take a long time to soak into the wood. The viscosity may be lowered somewhat by heating the solution. However, from a purely practical viewpoint it is more convenient to use room temperature and lower concentration ranges. While concentrations of about 5 weight percent of resin binder show definite improvement in dimensional stability of treated wood and in fixing of other additives therein, a concentration of at least about 8 weight percent of resin should be used if substantial avoidance of water leaching of additives is sought.

The amount of wood preservative or mixtures of wood preservatives used again depends upon the degree of protection desired. Pentachlorophenol for example may be used in concentration ranges of about 0.5 to 6 weight percent, preferably about 2 to 5 weight percent. Tributyltin oxide adducts, on the other hand, are generally used at concentration ranges of about 0.1 to 0.5 weight percent. Similarly fire retardants or mixtures of fire retardants may be used in concentration ranges of about 2 to 15 weight percent again depending upon the degree of protection needed. Other wood treating chemicals contemplated are copper-8-quinolinolate and copper ammonium borate.

The wood may be treated sequentially or concurrently with preservatives, fire retardants and resin binder. Where wood is first treated with fire retardant or wood preservative and then with the binder of the present system, higher levels of protection may be obtained than would be possible with a concurrent treatment. For example, a fire retardant such as borax may be compatible with the present binder system up to only 4 weight percent and a greater quantity is needed to be deposited in the wood for the level of fire protection desired. Under such circumstances wood could first be treated with 10-15 weight percent borax in water and subsequently with the binder of the present system to fix the higher concentration of borax in the cell walls.

The resin binder and other wood treating chemicals may be contacted with the wood by any suitable technique. Conventional methods such as brushing, spraying, dipping, or subjecting the wood to vacuum followed by the treating solution under pressure at ambient or elevated temperature are all contemplated depending upon the wood and extent of penetration desired.

Conventional pigments, dyes, thickeners, flattening agents and extenders, both organic and inorganic, may be included in the formulations as desired.

EXPERIMENTAL

EXAMPLE I

The enhancement of wood properties by the present invention is reflected in the resistance of wood to dimensional change with changes in moisture content, and also the dimensional change in wood itself. For samples of maple of about 1.5 cm$^3$ impregnated with 20, 40 and 60% (by weight) concentration solutions of resin and air dried for two weeks, the following percentage changes in dimensions at saturation moisture level and at dry state were found.

| Resin in Solution (wt. %) | Tangantial (%)* | Radial (%)* |
|---|---|---|
| 0 | 112.18 | 105.46 |
| 20 | 110.25 | 103.86 |
| 40 | 109.24 | 103.34 |
| 60 | 104.94 | 101.83 |

* $\frac{\text{Dimension at saturation}}{\text{Dimension on oven drying}} \times 100$ The above results were obtained by soaking the wood samples overnight in the resin solutions in the following table. After the two week air drying period they were resoaked in water overnight. Oven drying was at 150° C. until a constant weight was obtained—usually in about three hours.

| Ingredients (by weight) | 60% | 40% | 20% |
|---|---|---|---|
| Medium oil water dilutable alkyd. 80% in butyl Cellosolve | 627.0 | 412.0 | 200.0 |
| Ammonium Hydroxide 28% | 36.0 | 24.0 | 12.0 |
| Butyl Cellosolve | 34.6 | 77.6 | 120.0 |
| Water | 138.4 | 310.4 | 480.0 |

-continued

| Ingredients (by weight) | 60% | 40% | 20% |
|---|---|---|---|
| 6% Cobalt Naphthenate* | 4.0 | 2.7 | 1.3 |
| 18% Zr Naphthenate* | 2.0 | 1.3 | 0.7 |
| Activ-8* | 2.8 | 1.9 | 0.9 |
| BYK 301** | 6.0 | 4.0 | 2.0 |
| TOTAL | 836.0 | 824.0 | 812.0 |

*6% Co Naphtenate, 18% Zr Naphthenate and Activ-8 are driers.
**BYK 301 is a wetting agent.

It is obvious that the impregnation of wood with the solution has resulted in great enhancement of dimensional stability and that the dimensional stability imparted in the tangantial direction is greater. It is also significant that the treatment results in equalizing the dimensional changes in both the tangantial and radial direction. The improvement in dimensional stability also shows that there is actual cell wall penetration of the polymer.

Similar results were obtained when bass wood, sugar pine, yellow poplar samples were treated with the above solutions.

In this study it was also found that wood after treatment with the resin solution, followed by air curing for a week, did not return to its original dimensions. Percent change in dimensions on such treatment for maple is given below:

| Resin Concn. (wt %) | Tangantial (%)* | Radial (%)* |
|---|---|---|
| 0 | 0 | 0 |
| 20 | 103.4 | 101.45 |
| 40 | 103.86 | 102.15 |
| 60 | 105.81 | 102.64 |

* $\frac{\text{Length of treated sample (oven dry)}}{\text{Length of untreated sample (oven dry)}} \times 100$ This is additional evidence of the fact that the polymer does indeed penetrate the wood cell walls.

EXAMPLE II

Aside from imparting dimensional stability the present treatment of wood also results in greatly enhanced check resistance. This was demonstrated by taking three equivalent samples of red oak.

Sample #1 was kiln dried only and is relatively free of checks.

Sample #2 was kiln dried, water saturated by soaking in water from about 20 minutes, and then oven dried. Numerous checks are visible.

Sample #3 was kiln dried and then soaked in the polymer system set forth in the table below. Upon oven drying, only a few small checks are visible.

| Ingredients (by weight) | |
|---|---|
| Medium oil water dilutable alkyd 80% in butyl Cellosolve | 248.70 |
| Ammonium Hydroxide, 28% | 15.00 |
| Butyl Cellosolve | 59.51 |
| Water | 493.93 |
| Tinuvin 328* | 4.46 |
| 6% Cobalt Naphthenate | 1.24 |
| 18% Zr Naphthenate | 0.62 |
| Active-8 | 1.36 |
| BYK 301 | 2.60 |

-continued

| Ingredients (by weight) | |
|---|---|
| TOTAL | 827.42 |

*Tinuvin 328 in a u.v. absorber.

EXAMPLE III

It has been mentioned earlier that wood preservatives and fire retardants that normally leach out of wood on exposure to water, for example rain, can be substantially fixed in the wood and made non-leachable by this invention.

Pentachlorophenol is commonly used as a preservative for wood. For this application pentachlorophenol is generally dissolved in a solution of aromatic and aliphatic hydrocarbons. Blocks of wood treated with pentachlorophenol on leaching with water lose the preservative at a very fast rate. Thus a 1 $cm^3$ block of wood was treated with 5 weight percent pentachlorophenol and its chlorine content analysed before and after leaching with water (one month) using Energy-Dispersive X-Ray Analysis (EDXA). Analysis for the absence of chlorine in the leached sample clearly shows that most of the pentachlorophenol was leached out. Another 1 $cm^3$ block of wood was treated with a solution of 5 weight percent pentachlorophenol and 14 weight percent water dilutable alkyd. The block was air dried for 30 days. Again its chlorine content was analyzed using EDXA before and after water leaching (one month). The results clearly show that very little chlorine was lost—the polymer having fixed the pentachlorophenol within the wood.

This same method can be used to add other chemicals to wood such as fire retardants and to make them non-leachable.

*The treating solution was prepared from the combination of Mixes A and B set forth in the following table.

| Mix A | |
|---|---|
| Pentachlorophenol | 823 |
| Butyl Cellosolve | 3837 |
| Ammonia 28% | 180 |
| | 4840 |
| Mix B | |
| Arolon* 385 | 955 |
| Ammonia 28% | 22 |
| Butyl Cellosolve | 64 |
| Cobalt hydrocure | 6.5 |
| Activ-8 | 4.0 |
| Mix A | 1190 |
| Mix for 15 minutes and add: | |
| Water | 2700 |
| Adjust pH to 8.5 with ammonia (28%) | |

*water dilutable alkyd resin sold by Ashland Chemical Company

EXAMPLE IV

This example shows that, like the preservative of Example III, a fire retardant may be deposited within the wood cell walls and fixed against water leaching by the resin.

The procedure of Example II was repeated except that to the binder mixture of Example II was added 42 gms (5%) of sodium borate. The wooden blocks used were 5 cm × 10 cm × ½ cm. Subsequent to treatment the block was air dried at room temperature for two weeks. It was then cut into half along its width. One of the halves was repeatedly washed with water and air dried.

The water washed and the unwashed portions of the block were exposed to a lighted torch held at a distance of 10 cm from the end grain side of the block. Both blocks took 8 minutes to start charring. As a comparison an untreated block under identical conditions started charring in 4 minutes.

The foregoing discussion and experimental work primarily illustrates the present invention with water dilutable alkyd resins. As indicated, the invention may be practiced with any water dilutable polymeric system that is soluble in polar solvents or mixtures of polar solvents and water while being thereafter convertable to a water insoluble stage. In this regard water dilutable film forming resins made from vinyl monomers have been found to have advantageous properties in this invention. These vinyl monomer derived water dilutable resins are converted to a water insoluble form by water evaporation and film formation and/or by volatilization of ammonia or an amine that has been reacted with acid groups in the resin.

The vinyl monomer based water dilutable resins are advantageous in that they can be formulated with much less organic polar solvent than the water dilutable alkyd resins. In fact, certain types of these vinyl resins require no organic solvent at all and are formulated with water alone as the solvent as disclosed and claimed in copending patent application Ser. No. 91,029 filed Nov. 5, 1979.

In the present case small quantities of water miscible organic solvent may be employed in order to provide a vinyl resin which will form a film under ambient conditions. The use of only small quantities of organic solvent (generally less than about 10% by weight, and preferably less than 5% by weight, of the formulation) has both environmental and economic benefits. The functional benefits are most significant.

In this connection the organic cosolvents utilized to impart water dilutability to the alkyd polymer mixture are also good solvents for some of the dark colored chemicals naturally present in wood. Consequently, the application of these solutions to the wood brings these dark color compounds to the surface, darkening the wood and detracting from its natural beauty. In addition, the water miscible organic solvents create difficulties with respect to certain types of water soluble chemicals such as wood preservatives and fire retardants which are added to the formulation for permanent disposition in the wood treated with the formulation. The addition of certain of these compounds to a formulation containing larger quantities of organic solvent separates the mixture into two layers—a resin cosolvent layer and a water-wood preservative and/or fire retardant layer. This phenomenon excludes the use of most water soluble compounds for formulating a unitary wood treating solution and the systems containing larger amounts of organic solvent are thus useful only when used in conjunction with chemicals which have a fair amount of solubility in the mixture, such as pentachlorophenol or fire retardants soluble in polar solvents. Such compounds are expensive compared to water soluble compounds and often are not as effective in like amounts. The use of resins formed from vinyl monomers which permit the use of a relatively small amount of organic cosolvents avoid the foregoing problems present in systems which require larger amounts of organic cosolvents.

Polymers formed from vinyl monomers such as acrylic polymers, both copolymers and homopolymers are generally produced by reactions which result in a relatively narrow molecular weight distribution. As with the alkyd resins, the selected vinyl based resin should contain at least 5 weight percent of the resin molecules present having a molecular weight lower than about 1000 and preferably at least about 10 weight percent of resin molecules having a molecular weight below about 1000. In the preferred embodiment it is desired to have in the formulation sufficient larger molecules that cannot penetrate the wood cell wall and therefore form a protective and decorative outer surface coating. To this end the preferred formulations will usually involve combining two different vinyl polymers, one having the small molecules for penetration into the wood, and the other having relatively larger molecules for film forming on the surface of the wood. The larger molecules will generally have a molecular weight of about 20,000–200,000 with a typical formulation having 95% of the molecules in a molecular weight range of 90,000–110,000.

It has been found that most emulsions made by emulsion polymerization of vinyl containing monomers may be used to formulate the treating solution. Examples of monomers that contain a vinyl group are vinyl acetate, methyl methacrylate, ethyl ethacrylate, acrylamide, acrylonitrile, styrene, isoprene, and malic anhydride. These monomers may be polymerized by themselves to form homopolymers. Preferably, however, a judiciously selected mixture of monomers is used to control such properties as minimum film forming temperature, the hardness of the dried film, etc. The polymerization is generally carried out in the absence of oxygen using a free radical initiator such as a peroxide, the monomer or monomer mixture being suspended in water, by agitation and its temperature controlled above the temperature needed to decompose the initiator.

Many acrylic emulsions sold commercially contain organic cosolvents which serve as thickeners and/or coalescing agents. When water soluble wood preservatives or fire retardants are added to these, flocculation of the emulsion or one or more of the additives may occur.

Examples of emulsions that are found suitable are given later. Other emulsions that are film formers at or below room temperature and are stable in the presence of the additives may be used.

The low molecular weight polymers, either in the emulsion form or as clear solutions are synthesized much like the polymerization reaction described above, except that a suitable chain transfer ingredient is included in the reaction mixture.

Emulsion polymers having a large or small molecular weight, when made by using an acid, such as acrylic acid or methacrylic acid, or a mixture of such acids, as part of the monomer mixture, tend to form clear solutions when amines or ammonia are added to them to raise their pH to the alkaline side, generally above 8 or 8.5.

Athough soluble in this form, when used as binders or film formers, they lose the ammonia or the volatile amine (if a volatile amine is used to adjust the pH) by evaporation and become water insoluble.

When a mixture of a high molecular weight polymer and a low molecular weight polymer are used, the low molecular weight polymer, together with water and the additives penetrate the wood cell walls and on the evaporation of water become deposited therein. The high molecular weight fraction is added to form a film on the outer surface, thus protecting it from the elements, and also adding an aesthetic appeal. The inclusion of this surface film former component also enables the addition to the treating solution of pigments and dyes, thus providing a wood treating and a wood coating or staining system in a single mixture. The weight ratio of high molecular weight resin to low molecular weight resin will generally be from 95:5 to 50:50 and more usually from about 90:10 to 70:30.

When such pigmented systems are used the pigments also serve as ultraviolet (UV) light absorbers. It is well known that UV light degrades wood. Consequently the inclusion of the pigment further serves to enhance the life of wood. In clear coatings the same objective can be achieved by the addition of UV absorbers. Typical examples of UV absorbers are given in the preceding examples.

The following examples illustrate typical formulations employing resins formed from vinyl monomers and which can be formulated with a relatively small amount of organic polar cosolvent. In Example V both the large and small molecular weight resins have a plurality of acid groups which are neutralized with the ammonium hydroxide. The result is a very soluble water white transparent solution. Example VIII illustrates the ability of the formulation to incorporate inorganic fire retardant and preservative salts without causing phase separation because of the relatively low concentration of organic polar cosolvent.

EXAMPLE V

| | |
|---|---|
| Rhoplex B-505* | 45.00 |
| Acrysol 527** | 4.44 |
| Ammonium Hydroxide, 28%*** | 1.00 |
| Water | 46.56 |
| Methyl Carbitol | 3.00 |
| Total | 100.00 |

*Rhoplex 505 is a high molecular weight acrylic copolymer manufactured by Rohm & Haas Company, 40% n.v.
**Acrysol 527 in an all acrylic (low molecular weight) resin solution manufactured by Rohm & Haas Company, 45% n.v.
***Ammonium Hydroxide is used to adjust pH and obtain clarification
Total resin solids of above formula is 20%. The ratio of B-505 to Acrysol 527 on solids basis is 9.0:1.0.

EXAMPLE VI

| | |
|---|---|
| Synthemul 40-450* | 32.65 |
| Acrysol 527 | 8.88 |
| Ammonium Hydroxide 28% | 2.00 |
| Water | 52.47 |
| Butyl carbitol | 4.00 |
| Total | 100.00 |

*Synthemul 40-450 is a polyvinyl acetate, acrylic copolymer emulsion, 49% n.v., produced by Reichhold Chemicals Inc.
Total resin solids = 20%
S-40-450/AC 527 ratio = 80:20

EXAMPLE VII

| | |
|---|---|
| E-1630, 45% n.v.* | 40.00 |
| Acrysol 527 | 4.44 |
| Water | 52.06 |
| Methyl Carbitol | 3.50 |
| Total | 100.00 |

*E-1630 is an experimental acrylic emulsion manufactured by Rohm & Haas Company, n.v. = 45%
E-1630/AC-527 ratio = 90:10
Total resin solids: 20%

EXAMPLE VIII

| | |
|---|---|
| E-1630 | 40.00 |
| Acrysol 527 | 4.44 |
| Fire retardant* | 10.00 |
| Nylate-10** | 2.00 |
| Water | 40.56 |
| Methyl Carbitol | 3.00 |
| Total | 100.00 |

*Fire retardant is produced by the complete neutrilization of dimethylamine with phosphoric acid.
**Nylate-10 is a wood preservative manufactured by Seymore Chemicals Co. The active ingredient is copper-8-quinolinolate.

EXAMPLE IX

The formulation of Example VIII was used to apply to two blocks of yellow cedar 4"×8". The wood was soaked in the formulation for 15 minutes and then allowed to air dry overnight at room temperature. One of the boards was then washed under running tap water for 6 hours and again redried overnight at room temperature. The boards were then exposed to the flame of a blow torch held 6" from their surface. Neither of the two boards supported any flame after the blow torch was removed. However, local charring was visible after a period of 3 minutes. In a control block of wood which was not treated at all, the wood caught fire within 1 minute when exposed to the flame, and the fire continued to burn after the torch was removed. This experiment shows that the fire retardant was effective in reducing the flame spread and had become non-leachable even though originally it was a water-soluble compound.

EXAMPLE X

A block of white oak approximately 1½"×3"×4" was soaked in the formulation of Example VIII for 12 hours and air dried for 24 hours. An identical size block was used as an internal control. The treated block and the control block were then soaked in water for 2 hours and dried in an oven at 250° F. On examination of these dried blocks it was found that the untreated block had checked along the ray cells whereas the treated block showed no checking whatsoever. This experiment shows that the formulation of Example VIII had effectively stabilized the wood.

The entire experiment was repeated, except that the Acrysol 527 was omitted from the formulation of Example VIII. In this case it was found that both the control and the treated blocks checked on oven drying. This experiment shows that the high molecular weight acrylic polymer alone did not effectively stabilize the wood.

We claim:

1. A method for treating wood to enhance its properties comprising: contacting the wood to be treated with sufficient water dilutable resin in a water miscible solvent to deposit an effective amount of said resin in the cell walls of said wood, said resin containing molecules having a molecular weight of less than about 1000 and of a size which can enter the free space in said cell walls in the presence of said solvent in an amount sufficient to stabilize the wood, and converting the resin in said cell walls to a water insoluble form at ambient conditions.

2. A method in accordance with claim 1 wherein said solvent includes water.

3. A method in accordance with claim 2 wherein said solvent includes a water miscible organic fluid.

4. A method in accordance with claim 3 wherein said resin is an alkyd which is curable by exposure to air to become water insoluble.

5. A method in accordance with claim 3 wherein said resin is formed from a vinyl monomer.

6. A method in accordance with claim 5 wherein said resin is formed from an acrylic monomer.

7. A method in accordance with claim 5 wherein said resin comprises a film forming emulsion, water insolubilized by evaporation of solvent.

8. A method in accordance with claim 5 wherein said resin contains amine or ammonia neutralized acid groups for imparting water solubility thereto, volatilization of said amine or ammonia causing said resin to become water insoluble.

9. A method in accordance with claim 2 wherein said resin contains at least about 5 weight percent of molecules having a molecular weight of less than about 1000.

10. A method in accordance with claim 9 wherein said resin contains at least about 10 weight percent of molecules having a molecular weight of less than about 1000.

11. A method in accordance with claim 10 wherein said resin contains a substantial portion of molecules having a molecular size larger than can enter the free space in said cell walls and selected for forming a surface film on said wood.

12. A method in accordance with claim 11 wherein said molecules of larger molecular size have a molecular weight of about 20,000–200,000.

13. A method in accordance with claim 9 wherein said resin is present in the resin-solvent combination in a weight percent of about 5–70.

14. A method in accordance with claim 10 wherein said resin is present in the resin-solvent combination in a weight percent of about 5–30.

15. A method in accordance with claim 14 wherein said resin is present in the resin-solvent combination in a weight percent of at least about 8.

16. A method in accordance with claim 3 wherein an additional wood treating chemical in a water miscible solvent is contacted with said wood to deposit an effective amount of the chemical in the cell walls of the wood prior to converting the resin in the cell walls to a water insoluble form, and thereafter fixing the wood treating chemical in the cell walls by converting said resin to a water insoluble form.

17. A method in accordance with claim 5 wherein an additional wood treating chemical in a water miscible solvent is contacted with said wood to deposit an effective amount of the chemical in the cell walls of the wood prior to converting the resin in the cell walls to a water insoluble form, and thereafter fixing the wood treating chemical in the cell walls by converting said resin to a water insoluble form.

18. A method in accordance with claim 16 wherein said wood treating chemical is present in the same solvent as the resin and is concurrently contacted with the wood whereby wood treating chemical and resin are deposited in the cell walls together.

19. A method in accordance with claim 17 wherein said wood treating chemical is present in the same solvent as the resin and is concurrently contacted with the wood whereby wood treating chemical and resin are deposited in the cell walls together.

20. A method in accordance with claim 16 wherein said wood treating chemical is selected from wood preservatives and fire retardants.

21. A method in accordance with claim 17 wherein said wood treating chemical is selected from wood preservatives and fire retardants and said water miscible organic fluid comprises not more than about 10 percent weight of the resin-solvent combination.

22. A method in accordance with claim 21 wherein said water miscible organic fluid comprises not more than about 5 percent weight of the resin-solvent combination.

23. A method in accordance with claim 21 or 22 wherein said wood treating chemical is water soluble.

* * * * *

Disclaimer 4,276,329.—*Ramesh C. Vasishth*, Danville, Calif.; and *Dodwell P. deSilva*, Vancouver, Canada. WOOD TREATMENT PROCESS AND PRODUCT THEREOF. Patent dated June 30, 1981. Disclaimer filed Nov. 5, 1984, by the assignee, *Envirosol Systems International, Ltd.*

Hereby enters this disclaimer to claims 1-23 of said patent.
[*Official Gazette January 1, 1985.*]

REEXAMINATION CERTIFICATE (349th)
United States Patent [19]

Vasishth et al.

[11] B1 4,276,329

[45] Certificate Issued  May 14, 1985

[54] WOOD TREATMENT PROCESS AND PRODUCT THEREOF

[75] Inventors: Ramesh C. Vasishth, Danville, Calif.; Dodwell P. deSilva, Vancouver, Canada

[73] Assignee: Envirosol Systems International, Ltd., Orinda, Calif.

Reexamination Request:
No. 90/000,338, Mar. 7, 1983

Reexamination Certificate for:
| | |
|---|---|
| Patent No.: | 4,276,329 |
| Issued: | Jun. 30, 1981 |
| Appl. No.: | 91,030 |
| Filed: | Nov. 5, 1979 |

Disclaimer of claim(s) 1-23 Filed: Nov. 5, 1984, (1050 O.G. 310)

Related U.S. Application Data

[63] Continuation-in-part of Ser. No. 23,051, Mar. 22, 1979, abandoned.

[30] Foreign Application Priority Data

May 16, 1979 [CA] Canada ................. 327689

[51] Int. Cl.$^3$ ................ B05D 1/18; B05D 3/02
[52] U.S. Cl. ................. 427/393; 427/440; 524/376; 524/389
[58] Field of Search .......... 427/393, 440; 523/502; 524/600, 601, 604, 376, 389

[56] References Cited

U.S. PATENT DOCUMENTS

| | | | |
|---|---|---|---|
| 3,100,157 | 8/1963 | Schroeder et al. | 106/287 |
| 3,105,773 | 10/1963 | Frank et al. | 117/72 |
| 4,085,251 | 4/1978 | Rak | 428/485 |
| 4,134,771 | 1/1979 | Bentsen | 106/15 R |

FOREIGN PATENT DOCUMENTS

| | | |
|---|---|---|
| 466527 | 5/1940 | Belgium . |
| 913524 | 10/1972 | Canada . |
| 2644077 | 11/1977 | Fed. Rep. of Germany . |
| 37218 | 2/1969 | Finland . |
| 2057365 | 4/1971 | France . |
| 2391257 | 12/1978 | France . |
| 496081 | 2/1974 | Japan . |
| 125703 | 11/1976 | Japan . |
| 110803 | 9/1977 | Japan . |
| 323794 | 5/1970 | Sweden . |
| 361618 | 11/1973 | Sweden . |
| 425640 | 10/1982 | Sweden . |
| 961055 | 6/1964 | United Kingdom . |
| 1089527 | 11/1967 | United Kingdom . |
| 1108127 | 4/1968 | United Kingdom . |
| 1156619 | 7/1969 | United Kingdom . |
| 1164689 | 9/1969 | United Kingdom . |
| 1281911 | 7/1972 | United Kingdom . |
| 1509000 | 4/1978 | United Kingdom . |
| 1578222 | 11/1980 | United Kingdom . |
| 1590069 | 5/1981 | United Kingdom . |

OTHER PUBLICATIONS

H. M. Schroeder, "Water-Dispersed Industrial and Architectural Coatings", Paint and Varnish Production, pp. 31-46, Mar. 1965.
H. M. Schroeder, "Coating Vehicles of Water Dispersed Drying Oils", pp. 1-15, Fourth Annual Symposium, North Dakota State University Jun. 1962.
Spencer-Kellogg, Technical Service Bulletin, "LINAQUA Water-Soluble Linseed Oil For Exterior House Paints", pp. 1-14, 1962.
Fisher et al., "Organic Protective Coatings", p. 236, 1953.
Schneider, M. H., "Scanning Electron Microscope Study of a Coating Component Deposited from Solution Into Wood" JOCCA, pp. 441-444 1979.
Wood handbook, Forest Products Laboratory, Handbook No. 72, pp. 16-6 to 9; 18-5 to 7, 1974.
Letter to Mr. J. D. Ekins, pp. 1 and 2, Oct. 23, 1962.
Flick, Ernest W., Water-Based Paint Formulations, p. 123, 1975.
Bathe, O. M., Polyol Selection For Water Soluble Polyesters, Amoco Chemicals Corp., Presented Mar. 10, 1972 before the Eleventh Biennial Western Coatings Societies' Symposium and Show, Anaheim, Calif.
Amoco Chemicals Corporation-Bulletin, Water Soluble Air Dry Enamels from Resins Based on TMA-IPA-95 HBPA, Jan. 1967.
The Condensed Chemical Dictionary, Eighth Edition, p. 28, 1971.
American Wood-Preservers' Association, Effect of Solvent on the Penetration of Wood Preservatives by Non-Pressure Hochman Processes, pp. 170-173, 1971.
"New Formulating Ideas For Linaqua", Spencer Kellogg Technical Service Bulletin, 1963, pp. 1-6.
Clarke, S. H., "Fine Structure of the Plant Cell Wall", NATURE, Nov. 19, 1938, pp. 899-904.
Browne, "Behavior of House Paints on Different Woods," Forest Service Bulletin No. R1053, U.S. Dept. of Agriculture, Forest Products Laboratory (1948).
Tarkow, et al., "Interaction of Wood with Polymeric Material-Penetration Versus Molecular Size," Forest Products Journal, 16 (10), 61-65 (1966).
Stone et al., "A Study of Cell Wall Structure by Nitrogen Adsorption," Pulp and Paper Magazine of Canada, Aug., 1965, T-407-T-414.
Davies, "Electron Microscopy and Cell Wall Porosity," Appita, 21 (4), 117-130 (1968).

Primary Examiner—Michael R. Lusignan

[57] ABSTRACT

A method for treating wood to enhance its properties comprising: contacting the wood to be treated with sufficient water dilutable resin in a water miscible solvent and water to deposit said resin in the cell walls of the wood fibers, said resin containing molecules of a size which can enter the free space in said cell walls, and converting the resin in said cell walls to a water insoluble form. The treatment provides wood of improved dimensional stability and resistance to checking on exposure to water. Further improvements in the wood properties can be obtained by depositing additives such as preservatives or fire retardants in the cell walls of the wood and fixing the additives therein with the insolubilized resin.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-23 are now disclaimed.

* * * * *